Patented June 30, 1931

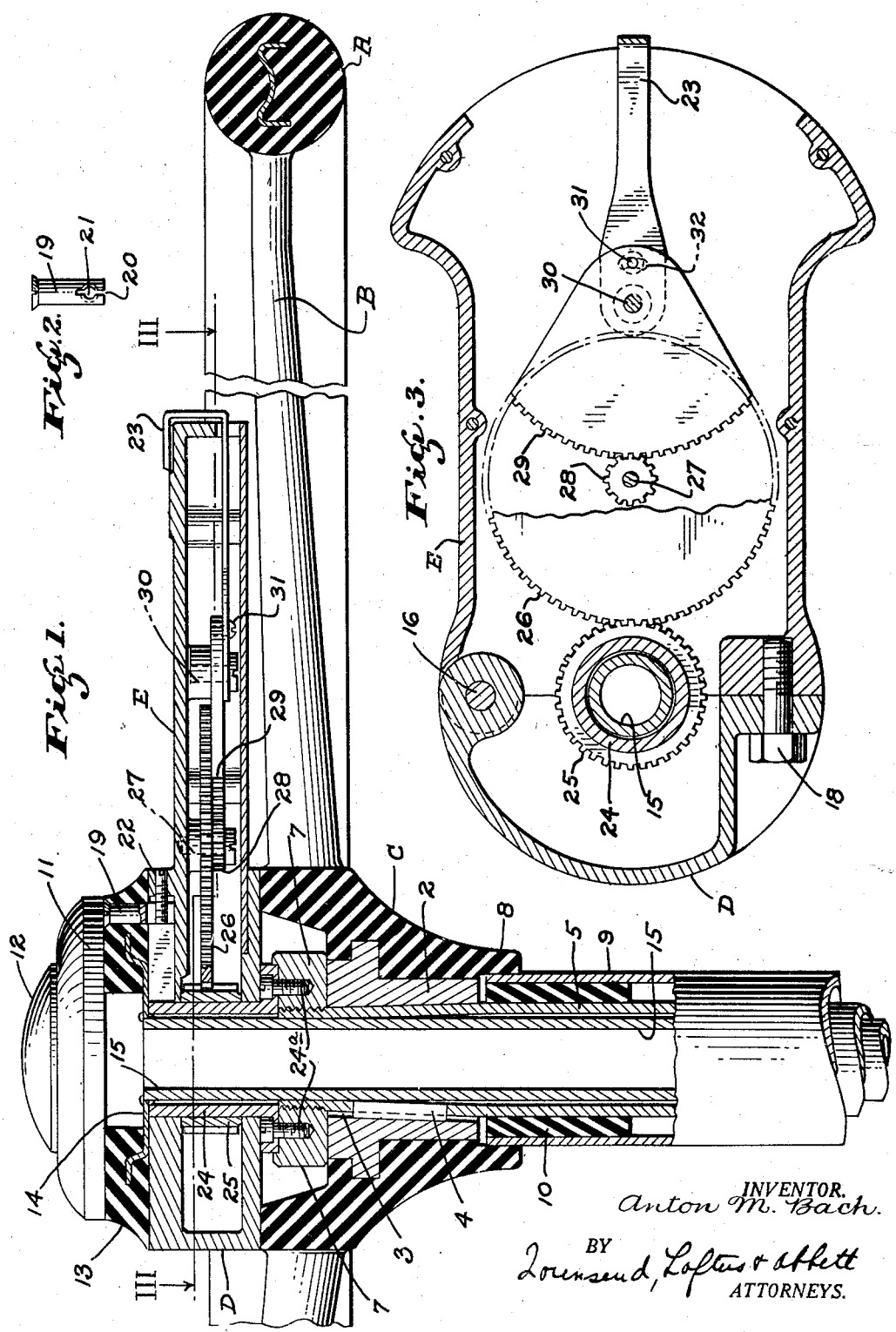

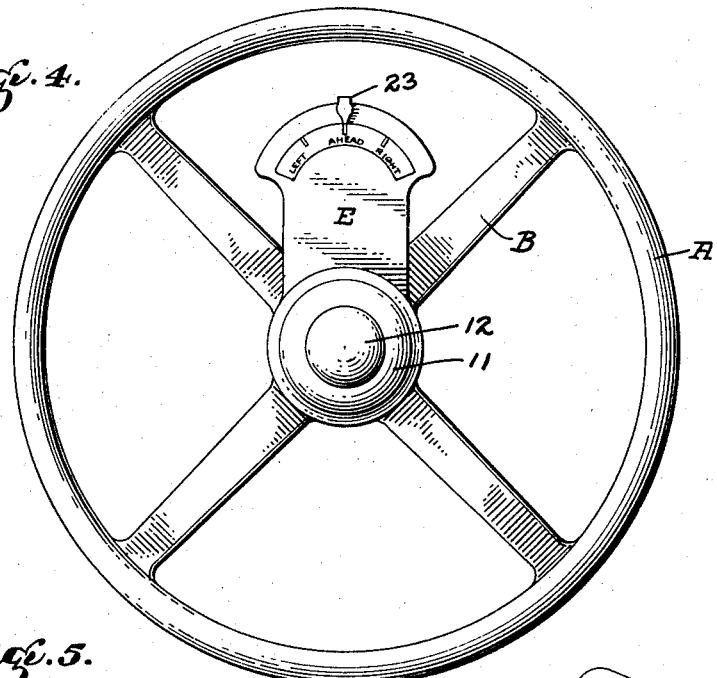
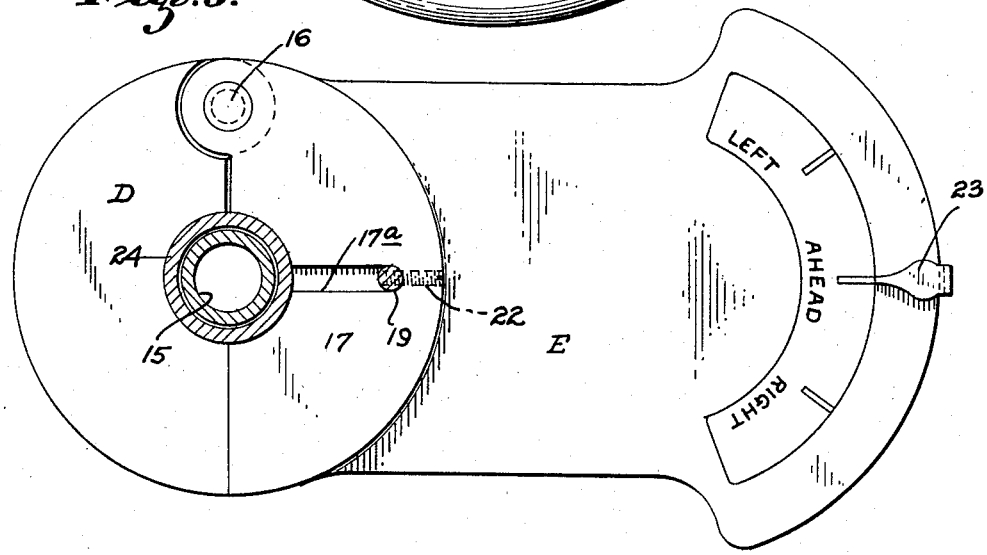
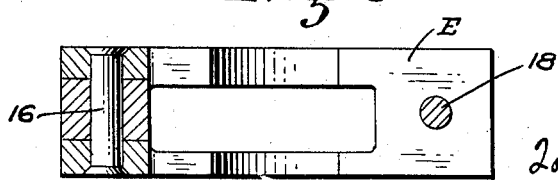

1,812,674

UNITED STATES PATENT OFFICE

ANTON M. BACH, OF PALO ALTO, CALIFORNIA

FRONT WHEEL POSITION INDICATOR

Application filed July 28, 1930. Serial No. 471,282.

This invention relates to a front wheel position indicator for automobiles and like vehicles.

The object of the present invention is to generally improve and simplify the construction and operation of devices of this character; to provide an indicator which will indicate the exact angular position of the front steering wheels so as to facilitate steering when entering or backing out of close quarters, etc.; to provide an indicator which may be attached to the steering column of an automobile at a point above the steering wheel where it will be in full view of the driver at all times; to provide an indicator which may be readily applied to the steering column of any automobile; and, further, to provide an indicator which is actuated by gears and in which the gear ratio may be readily changed to conform to the steering gear ratio of the particular automobile to which it is attached.

The indicator is shown by way of illustration in the accompanying drawings, in which—

Fig. 1 is a central vertical section of the steering wheel and the upper end of the steering wheel column, said view showing the attachment of the indicator, Fig. 2 is a detailed view of a locking pin, Fig. 3 is a horizontal section taken on line III—III of Fig. 1, Fig. 4 is a plan view of a steering wheel showing the indicator attached to the upper end of a steering column, Fig. 5 is an enlarged plan view of the housing in which the indicator is mounted, and Fig. 6 is a cross section taken on line VI—VI of Fig. 5.

Referring to the drawings in detail and particularly Fig. 1, A indicates the rim of a steering wheel, B the spokes, and C the hub of the steering wheel. This hub is provided with a bushing 2 which is suitably secured therein and this bushing is provided with a key 3 which engages a key 4 secured in the upper end of the steering wheel shaft or tube 5. The upper end of this tube is slightly tapered as shown to receive the hub C and bushing 2 and it is threaded as at 6 to receive a lock nut 7 which secures the steering wheel against endwise removal. The lower end of the hub indicated at 8 telescopes over the upper end of the steering wheel column or tube 9 which is stationary and this tube is provided with a bushing or sleeve 10 which forms an upper journal for the steering tube 5. The mechanism so far described is of standard construction and, practically speaking, is universally employed in most automobiles.

Practically all steering wheels are also provided with a cap 11 and a horn button 12 which fits over and engages the upper end of the steering wheel hub and this cap is secured by a washer or plate 13 which in turn is secured by means of a plate 14 to the upper end of a stationary inner tube 15. This tube is, in the present instance, lengthened sufficiently to permit the introductions of a housing generally indicated at D and E and this housing functions as a support for the front wheel position indicator hereinafter to be described.

The housing indicated by the reference characters D and E is best shown in Figs. 1, 3 and 5. The sections D and E are hingedly connected with relation to each other at the point indicated at 16. When a housing containing the indicating mechanism is to be applied, the section D of the housing is swung outwardly about the pivot pin 16 and it thus permits the inner end 17 of the housing section E to be introduced between the cap 13 and the upper end of the hub C. The section D is then swung back to closed position where it is secured by a cap screw or the like indicated at 18. In this position it surrounds the upper end of the stationary inner tube 15 and a sleeve 24 mounted exterior thereof as will hereinafter be described.

The housing containing the indicating mechanism when thus secured must also be secured against rotation, and this is accomplished by employing a pin 19 which extends through the plate 13. The lower end of the pin 19 is split as shown at 20, see Fig. 2, and it is provided with a transverse threaded opening 21 to receive a set screw 22. This screw is carried by the inner end of the housing section E and is screwed through this section into the threaded opening 21 and when so inserted and secured retains the indicator housing against rotation about the upper end of the steering column.

By referring to Figs. 1 and 5, it will be noted that the central inner portion 17 of the housing section E is slotted as shown at 17a. This slotting of the housing is an advantage when applying the mechanism as it avoids the necessity of removing the cap 11 and then inserting the pin 19.

The indicating mechanism proper consists of a series of gears journaled in the housing section E, said gears actuate a pointer or indicating arm 23 which extends through a slot formed in the forward end of the housing section E and which is bent upwardly and over the front end of the housing. This pointer moves over a dial face formed on the upper surface of the housing section E, this face being marked Right, Left, Ahead, and so on, and as the indicator 23 moves to the right or left of the central position marked Ahead it is possible for the driver to determine the exact angular position of the steering wheels.

The gear mechanism whereby the indicator 23 is actuated comprises a sleeve 24 secured to the lock nut 7 by means of screws 24a, see Fig. 1. The sleeve 24 carries a gear 25 which is pressed or otherwise secured on the exterior surface of the sleeve. This gear intermeshes with a larger gear 26 journalled on the pin 27 secured in the housing section E. Formed integral with the gear 26, or otherwise secured thereto, and mounted below this gear is a pinion 28 and intermeshing therewith is a segmental gear 29, which is journalled on a pin 30 secured in the housing section E. This segment carries the indicator 23, the indicator being secured by the headed end of the pin or screw 30, and being further secured by means of a set screw 31, which extends through a slot 32 formed in the inner end of the indicator, this slot permitting adjustment of the indicator so as to cause it to align with the wheels.

In actual operation with the indicating mechanism applied as illustrated in Fig. 1, it will be noted that the steering wheel is secured to the upper end of the steering tube 5 by means of the bushing 2 and lock nut 7 and that the sleeve 24 and gear 25 are also secured to the upper end of the steering tube by means of the screws 24a. Hence when the steering wheel is rotated the steering tube 5 will be rotated and so will the sleeve 24 and gear 25. Rotation of the steering tube 5 causes the front steering wheels to turn in one direction or another and rotation of the steering tube 5, together with the lock nut 7, sleeve 24, and gear 25, causes rotation of the gears 26, 28, and 29, hence causing the indicator 23 to swing in unison with the front steering wheels and thereby indicate the exact angular position of the front steering wheels under any and all conditions, this being a decided advantage when entering or backing out of close quarters or when turning about on narrow highways and so on.

It is well known that the lower end of the steering tube 5 carries a worm pinion and that this meshes with a segmental worm gear which in turn transmits motion to the steering mechanism interposed between the segmental worm gear and the front wheels. In some of the older make cars the gear ratio between the worm pinion and the segmental gear was substantially one to one, but in the later and more modern makes, particularly since the adaption of balloon tires, the gear ratio has been materially reduced in some cases two and one-half to one, three to one, and so on. This gear ratio varies on different makes of automobiles and it is accordingly necessary to provide a gear mechanism whereby the indicator 23 is actuated which may be readily and easily changed to suit varying gear ratios in the steering mechanism. This is readily accomplished in the present instance by merely changing the gear 28 and the segmental gear 29. The gears 25 and 26 being permitted to remain of constant ratio, in this instance, substantially two to one, hence by merely changing the two gears indicated at 28 and 29 it is possible to fit the indicator here illustrated to practically any automobile. This is of considerable importance when the cost of installation and manufacture is considered.

Another important feature is the position of the indicator, which may be interposed between the upper face of the steering wheel hub and the cap 11. By so positioning the indicator it will always be in full view of the driver where it can readily be observed under all driving conditions.

Another important feature is the ease of applying or removing the mechanism. That is, the mechanism is applied first by attaching the sleeve 24 and gear 25, and secondly, by inserting the indicator housing when this is in an open position and then locking it by inserting the cap screw 18 and the set screw 22. This operation is simple and is quickly accomplished. After application, if it is found that the indicator 23 is not exactly aligned with the wheels, it is possible to adjust it with relation to the gear segment 29 by merely loosening the set screw 31 and then aligning the indicator with relation to the wheels, after which it is set and locked in position by tightening the screw 31.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a mechanism of the character described a steering tube having a steering wheel secured thereto, a stationary cap disposed above the steering wheel and spaced therefrom, a housing interposed between the steering wheel and the cap, means securing the housing with relation to the cap, a front wheel position indicator mounted on the housing, and means whereby rotary movement of the steering wheel and steering tube is transmitted to actuate the indicator.

2. In a mechanism of the character described a steering tube having a steering wheel secured thereto, a stationary tube extending through the steering tube and the steering wheel, a stationary cap secured on said tube above the steering wheel and spaced therefrom, a housing interposed between the steering wheel and the cap, means securing the housing with relation to the cap, a front wheel position indicator mounted on the housing, and means whereby rotary movement of the steering wheel and steering tube is transmitted to actuate the indicator.

3. In a mechanism of the character described a steering tube having a steering wheel secured thereto, a stationary tube extending through the steering tube and the steering wheel, a stationary cap secured on said tube above the steering wheel and spaced therefrom, a housing interposed between the steering wheel and the cap, said housing being divided into a front and rear section and said sections being detachably connected to permit the housing to embrace the stationary tube, means securing the housing with relation to the cap, a front wheel position indicator mounted on the housing, and means whereby rotary movement of the steering wheel and steering tube is transmitted to actuate the indicator.

4. In a mechanism of the character described a steering tube having a steering wheel secured thereto, a stationary tube extending through the steering tube and the steering wheel, a stationary cap secured on said tube above the steering wheel and spaced therefrom, a housing interposed between the steering wheel and the cap, said housing being divided into a front and rear section and said sections being detachably connected to permit the housing to embrace the stationary tube, means securing the housing with relation to the cap, a front wheel position indicator mounted on the housing, a gear connected with the steering tube and rotatable in unison with the steering tube and the steering wheel, and a plurality of gears mounted in the housing and intermeshing with said first named gear and the indicator whereby the indicator is moved in unison with the front wheels.

5. In a device of the character described the combination with a steering tube and a steering wheel secured thereto, of a sleeve forming an extension of the steering tube, a stationary tube extending through the steering tube and the extension sleeve, a cap secured to the upper end of the stationary tube and spaced from the steering wheel, a housing interposed between said cap and the steering wheel and enclosing the extension sleeve, means securing the housing with relation to the cap, an indicator pivotally mounted on the housing, a gear secured to the extension sleeve, and a plurality of gears intermeshing with the pivotally mounted indicator and said first named gear whereby movement is transmitted to swing the indicator in unison with a pair of front steering wheels actuated by the steering wheel.

ANTON M. BACH.